June 22, 1943.
A. KUTSCHA
2,322,579
MILLING CUTTER ASSEMBLY
Filed June 27, 1942
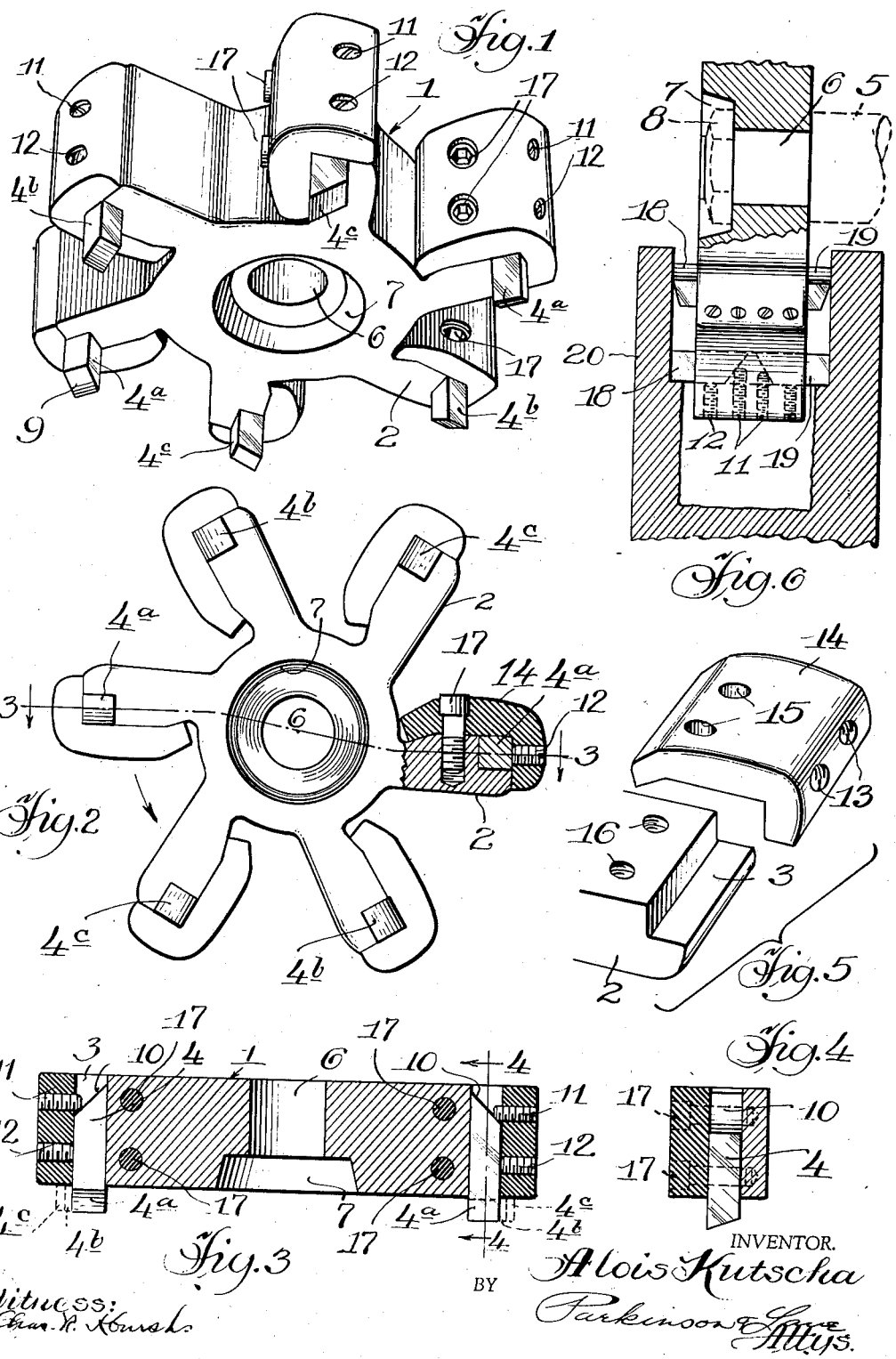
INVENTOR.
Alois Kutscha Patented June 22, 1943

2,322,579

UNITED STATES PATENT OFFICE 2,322,579

MILLING CUTTER ASSEMBLY

Alois Kutscha, Chicago, Ill.

Application June 27, 1942, Serial No. 448,714

5 Claims. (Cl. 29—105)

The present invention relates to a milling cutter of the type having spaced arms adapted to adjustably carry cutting blades disposed axially of the drive shaft. In the novel embodiment of the cutter assembly, the blades are mounted in slots provided or formed in the outer end of the spaced arms with successive slots disposed at varying distances or radii from the axis of rotation to permit most effective facing off, milling or recessing of castings or other objects being operated upon.

The invention further comprehends a novel construction of cutter head or assembly having multiple or dual cutting blades disposed in a manner for milling grooves or recesses of varying widths.

A further object of the invention is the provision of a novel mounting for the blades whereby these blades may be readily and accurately adjusted, but which blades when once adjusted, are rigidly maintained in operative position.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while I have shown therein a preferred embodiment, it is to be understood that the same is susceptible of modification and change, and comprehends other details, arrangements of parts, features and constructions without departing from the spirit of the invention.

In the drawing:

Figure 1 is a view in perspective of the novel milling cutter assembly.

Figure 2 is a bottom plan view of the cutter assembly with a portion of one of the arms and its associated parts in horizontal cross section to show the manner of mounting one of the blades in fixed position.

Figure 3 is a view in vertical cross section taken on the irregular line 3—3 of Figure 2.

Figure 4 is a view in vertical cross section taken in a plane represented by the line 4—4 of Figure 3.

Figure 5 is a disassembled view in perspective of the end of one of the blade-carrying arms and its retaining plate.

Figure 6 is a fragmentary view in end elevation of the cutter assembly provided with dual cutting blades with the casting or object to be recessed shown in vertical cross section.

Referring more particularly to the embodiment disclosed in Figures 1 to 5 of the drawing, the novel milling cutter assembly 1 is provided with a plurality of suitably spaced arms or projections 2, each formed with a slot 3 extending along one edge of the arm for receiving a cutting blade 4. This milling cutter assembly is adapted to be mounted upon a suitably rotated drive or operating shaft 5 having its reduced end received in a centrally located opening 6, the opening on the under side being shown as counterbored at 7 for receiving a lock nut 8 which fixedly mounts the assembly upon the shaft. If desired, the blade assembly may be provided with a keyway for anchoring it upon the shaft and preventing relative rotation therebetween. Each blade 4 is provided with a suitable cutting edge 9 and has its inner end tapered at 10 and disposed at a right angle to that of the tapered surface of the cutting edge to provide a cam surface permitting minute and accurate adjustment of each blade axially of the head by means of an adjusting set screw 11. Another set screw 12 is adapted to lock each blade in a fixed, adjusted position after the set screw 11 has adjusted the blade to the desired position.

The set screws 11 and 12 are adjustably mounted in threaded openings 13 in the outer flanged end of a retaining plate 14 and which plate is also provided with spaced threaded openings 15 aligned with threaded openings 16 in a side wall of each arm 2 for receiving bolts or other securing means 17 for anchoring and locking this retaining plate onto the arm. Each plate is of angular formation and so contoured as to conformably fit over a side wall and outer end of each arm so as to substantially enclose and retain the blade in position.

Figure 6 shows the cutter assembly provided with dual blades 18 and 19 each projecting axially but in opposite directions of the head or assembly. This construction is admirably adapted for milling a groove or recess in a casting or other object 20. In this construction each retaining plate is provided with a pair of set screws 11 having their inner ends abutting against the cammed or inclined surface 10 of the blades. This permits a ready and selective adjustment of the blades so as to mill or cut a slot of desired width. Although each blade is shown as provided with an adjusting screw, it will be readily apparent that a single screw or other cam means may be provided to adjust each pair of blades.

In order to most effectively operate upon an object to be faced or milled, the slots 3 of successive arms are preferably disposed at varying distances from the center or axis of rotation. For example, considering that the cutter head rotates in a clockwise direction, or when viewing the under side of the head as in Figure 2, in a counter-clockwise direction as shown by the arrow, the successive blades 4$^a$, 4$^b$ and 4$^c$ will be disposed at increasingly or successively greater distances from the axis or center of rotation as is clearly shown in dotted outline in Figure 3. This increase in radial distance from the center may vary in accordance with the material being milled. I have found that usually an increase in radius of approximately 3/64 inch for each successive blade of a set of three blades, such as blades 4$^a$, 4$^b$ and 4$^c$, gives satisfactory results, although any desired arrangement and combination of blades may be provided to give the desired results.

The cutter assembly may be mounted and operated on a horizontal or vertical shaft, as desired. Furthermore, the cutting tool or milling assembly is adapted for installation and operation upon any standard type of milling machine and may be used in dual or multiple relation. The speed of rotation of the cutter assembly and the speed of travel of the bed or support for the casting or work being operated upon are preferably so synchronized that the blades in any desired arrangement or combination cut to any desired depth into the face of the casting or object, or into the side walls of the groove or recess when operating in dual relation as shown in Figure 6.

The present novel construction provides a compact and rigid assembly in which the cutting blades are relieved of much of the strain to which they are subjected in prior tools. Although the blades 4 are shown as of solid metal, the body thereof may be made of a cheaper metal and the cutting edge or face of a suitable tool steel and suitably affixed to the body of the blade.

Having thus disclosed my invention, I claim:

1. A milling cutter assembly comprising a cutter head having a plurality of spaced arms, an axially extending slot provided in the end of each arm with the slots in adjacent arms being located at varying radii from the axis of rotation, a blade adjustably mounted in each slot and provided with a tapered inner end, a retaining plate adapted to closely conform to a side and end of each arm for encompassing the blade, means for anchoring each plate to a side wall of the arm, a set screw in said plate for engaging the tapered inner end of the blade for adjusting it axially, and means for locking the blade in its adjusted position.

2. A cutting tool for a milling machine having a plurality of cutting blades, comprising a cutter head having a plurality of uniformly spaced projecting arms, an axially extending slot located in an outer corner of the end of each arm, a cutting blade adapted to be axially adjustable in each slot, a retaining plate adapted to be mounted on each arm and to closely seat against a side and end of the arm to therewith encompass the blade, means for anchoring said plate onto the arm, an adjusting screw carried in said plate for accurately adjusting the blade, and means for locking the blade in its adjusted position.

3. A cutting tool for a milling machine having a plurality of cutting blades, comprising a cutter head having a plurality of uniformly spaced projecting arms, an axially extending slot located in an outer corner of the end of each arm, a pair of cutting blades extending in opposite directions and adapted to be axially adjustable in each slot, a retaining plate adapted to be mounted on each arm and to closely seat against a side and end of the arm to therewith encompass the blades, means for anchoring said plate onto the arm, and adjusting means carried in said plate for accurately adjusting the blades.

4. A milling cutter assembly for cutting a groove or recess in a casting or other object, comprising a cutter head having a plurality of spaced arms, an axially extending slot provided in the end of each arm for receiving a pair of cutting blades disposed axially of the head, a pair of cutting blades mounted in said slot and projecting in opposite directions therefrom, a retaining plate adapted to combine with the arm to enclose the blades except for their cutting edges, means for anchoring said plate to the arm, and means engaging the inner end of each blade for adjusting it axially whereby to mill a groove or recess of the desired dimensions.

5. A milling cutter assembly comprising a cutter head having a plurality of spaced arms, an axially extending slot provided in the end of each arm with the slots in adjacent arms being located at varying radii from the axis of rotation, a pair of cutting blades mounted in each slot and projecting in opposite directions therefrom, a retaining plate associated with each arm to enclose the blades except for their cutting edges, means for anchoring said plate to the arm, and cam means engaging the inner end of each blade for adjusting it axially whereby to mill a groove or recess of the desired dimensions.

ALOIS KUTSCHA.